Dec. 28, 1926.
J. F. PANYARD
PISTON PACKING
Filed June 1. 1925
1,612,210
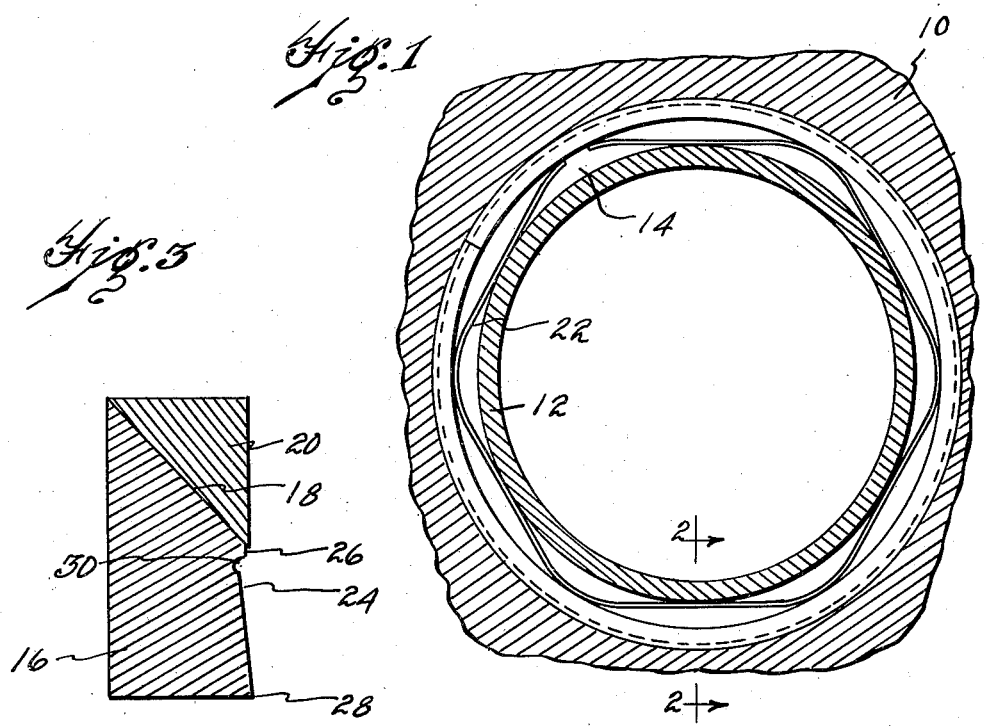
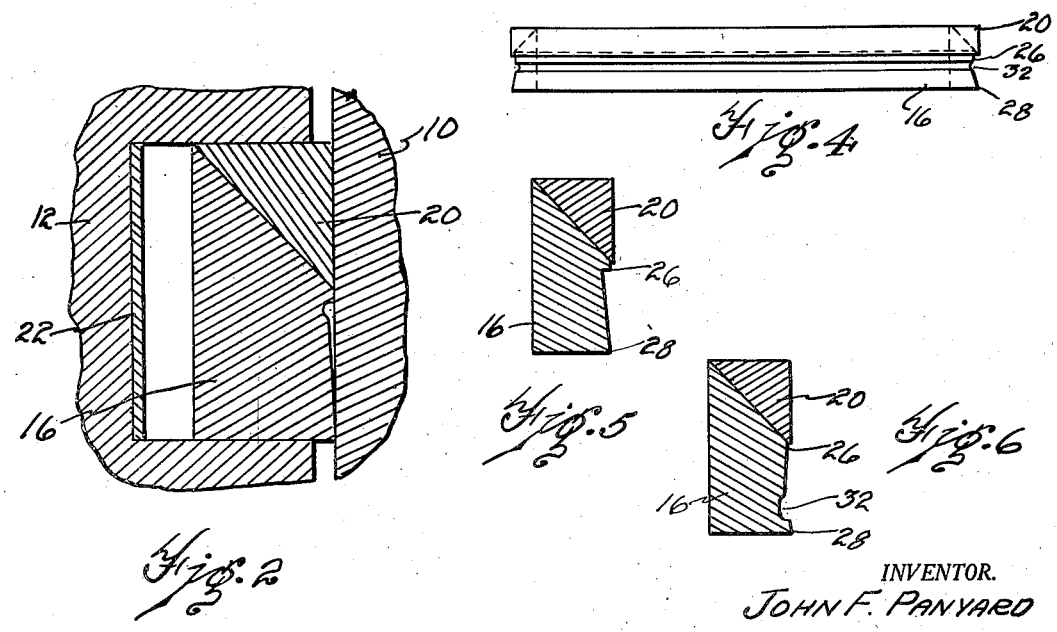
INVENTOR.
JOHN F. PANYARD
BY Parker + Burton
ATTORNEY.

Patented Dec. 28, 1926.

1,612,210

UNITED STATES PATENT OFFICE.

JOHN F. PANYARD, OF DETROIT, MICHIGAN, ASSIGNOR TO PANYARD MACHINE & MANUFACTURING COMPANY, OF DETROIT, MICHIGAN, A CORPORATION OF MICHIGAN.

PISTON PACKING.

Application filed June 1, 1925. Serial No. 34,035.

My invention relates to improvements in piston packing.

The object is to provide an improved packing for piston and cylinder construction, which packing is adapted to quickly seat itself in the groove in the piston and within the cylinder and once seated forms an unusually close point with the cylinder and with the side walls of the groove in the piston within which it is mounted.

My invention is particularly adapted for piston packing rings of large width and diameter which are commonly fitted to pistons adapted for slow and intermittent travel. In this type of construction it is necessary that the packing quickly accommodate itself to the cylinder within which it is mounted. I provide a packing which is so constructed as to be initially quick seating and the wear on which is such that the packing is always wedged laterally against the side walls of the groove and held outwardly against the cylinder wall.

The above objects and other meritorious advantages will more fully appear from the following description, accompanying drawing and appended claims.

In the drawing:

Figure 1 is a horizontally sectional view taken on line 1—1 of Fig. 2.

Fig. 2 is a fragmentary vertical sectional view taken on line 2—2 of Fig. 1 showing my improved packing after slight initial wear.

Fig. 3 is a cross-sectional view of the packing rings shown in Fig. 2 before initial wear.

Fig. 4 is a side elevation of my improved combined packing rings.

Fig. 5 is a sectional view through a modified form of my improved packing.

Fig. 6 is a sectional view through a second modified form of my improved packing.

In the drawings, let 10 indicate a cylinder portion and 12 a piston working therein and provided with a packing groove 14. My improved packing is mounted within groove 14 and comprises a ring 16 here shown as being substantially the width of the groove at the base and provided with an outer beveled face 18. Mounted between the beveled face 18 and the opposite side wall of the groove is a wedge ring 20 which normally overhangs the adjacent portion of the outer face of ring 16 so that when the wedge ring is brought into engagement with the cylinder wall it wedges the combined packing laterally against the side walls of the groove.

The ring 16 has its outer face cut away or dished at 24, as shown in the several figures of the drawing to provide a circumferential groove or channel about the ring. The lips of this groove form annular cylinder wall engaging portions 26 and 28, each of limited area and having a combined area less than the area of the cylinder wall engaging face of the wedge ring 20. Annular portion 26 is disposed adjacent the wedge ring 20 while annular portion 28 is disposed adjacent the opposite side wall of the groove.

There is provided an expansion spring 22 seated in the bottom of the groove underneath the packing bearing thereagainst and against the bottom of the groove of the piston at a plurality of points to hold the packing outwardly against the cylinder wall and laterally against the side walls of the groove. The wear on the packing is such that the ring 16, which presents a cylinder wall engaging face of less area than the cylinder engaging face of the wedge ring, is adapted to wear more rapidly than the wedge ring, wherefore the wedge ring cannot become loose or sloppy in the groove and the packing is always held tightly against the side walls of the groove and against the cylinder wall. The annular lip 26 of ring 16 serves to support the overhanging portion of the wedge ring and the opposite lip 28 is preferably beveled to an edge to form a particularly quick-seating point, and the preferable construction is to so build the rings that the diameter of ring 16 at the edge 28 is greater than the diameter of the ring at face 26, and is also normally greater than the diameter of the wedge ring 20. Under normal conditions, therefore, in a groove of proper size, the ring 16 would first contact the cylinder wall at point 28 to the exclusion of the wedge ring and the cylinder wall engaging face 26. Due to the cylinder wall engaging face 28 being narrowed to an edge it would quickly accommodate itself to the cylinder bore and after a short period of initial use both ring sections would engage the cylinder wall.

What I claim is:

1. In piston packing, a cylinder, a piston having a groove for packing, packing in said groove comprising a ring having an outwardly beveled face, a wedge ring seated between the beveled face of the first ring and the opposite side wall of the groove adapted when brought into contact with the cylinder wall to wedge the combined packing laterally against the side walls of the groove, the outer face of the first ring provided with a circumferential groove the lips of which form annular cylinder wall engaging portions of limited area, one adjacent the wedge ring and the other on the opposite side therefrom, one of which annular portions is of greater diameter than the other and is adapted to initially engage the cylinder wall to wear within a limited period of initial use after which the other portion engages the cylinder wall.

2. In piston packing, a cylinder, a piston mounted to work within the cylinder and having a groove for packing, packing in said groove comprising a ring having an outwardly beveled face, a wedge ring seated between the beveled face of the first ring and the opposite side wall of the groove adapted when brought into contact with the cylinder wall to wedge the combined packing laterally against the side walls of the groove, the outer face of the first ring provided with a circumferential groove the lips of which form annular cylinder wall engaging portions of limited area one adjacent the wedge ring one of said annular portions having a diameter larger than the other and larger than that of the wedge ring so as to initially, exclusively engage the cylinder wall to wear within a limited period of use after which the wedge ring and the other annular portion of the first ring engage the cylinder wall.

3. In piston packing, a cylinder, a piston having a groove for packing, packing in said groove comprising a ring having an outwardly beveled face, a wedge ring seated between the beveled face of the first ring and the opposite side wall of the groove adapted when brought into contact with the cylinder wall to engage the combined packing laterally against the side walls of the groove, said first ring provided with a circumferential channel the opposite lips of which form annular cylinder wall engaging portions of less combined area than the cylinder wall engaging face of the wedge ring, one of said annular portions being adjacent the wedge ring and of less diameter than the wedge ring, the other annular portion being adjacent the opposite side wall of the groove and of greater diameter than the wedge ring to initially exclusively engage the cylinder wall for a limited period of use.

In testimony whereof, I sign this specification.

JOHN F. PANYARD.